US012747792B2

(12) United States Patent
Kamiya

(10) Patent No.: US 12,747,792 B2
(45) Date of Patent: Sep. 29, 2026

(54) SEALING DEVICE AND ELECTRIC MOTOR

(71) Applicant: NOK CORPORATION, Tokyo (JP)

(72) Inventor: Yusuke Kamiya, Fukushima (JP)

(73) Assignee: NOK CORPORATION, Tokyo (JP)

( * ) Notice: Subject to any disclaimer, the term of this patent is extended or adjusted under 35 U.S.C. 154(b) by 206 days.

(21) Appl. No.: 18/714,415

(22) PCT Filed: Oct. 11, 2022

(86) PCT No.: PCT/JP2022/037858
§ 371 (c)(1),
(2) Date: May 29, 2024

(87) PCT Pub. No.: WO2023/100477
PCT Pub. Date: Jun. 8, 2023

(65) Prior Publication Data

US 2025/0020212 A1 Jan. 16, 2025

(30) Foreign Application Priority Data

Nov. 30, 2021 (JP) ................................ 2021-193933

(51) Int. Cl.
*H02K 15/32* (2025.01)
*F16J 15/324* (2016.01)
(Continued)

(52) U.S. Cl.
CPC ......... *F16J 15/3284* (2013.01); *F16J 15/324* (2013.01); *H02K 5/10* (2013.01)

(58) Field of Classification Search
CPC ......... F16J 15/324; F16J 15/3284; H02K 5/10
(Continued)

(56) References Cited

U.S. PATENT DOCUMENTS 5,571,457 A 11/1996 Vreeland et al.
11,365,807 B2 * 6/2022 Ito ........................ F16J 15/3208
(Continued)

FOREIGN PATENT DOCUMENTS

EP 3 012 495 4/2016
EP 3 078 885 10/2016
(Continued)

OTHER PUBLICATIONS

Yokoyama et al., English Machine Translation of JP2003035371 (Year: 2003).*
(Continued)

*Primary Examiner* — Rashad H Johnson
(74) *Attorney, Agent, or Firm* — GREENBLUM & BERNSTEIN, P.L.C.

(57) ABSTRACT

A sealing device includes an annular reinforcing ring fixed to a housing, an annular elastic member that includes a fixing portion fixed to the reinforcing ring, and a lip that protrudes from the fixed portion and is in slidable contact with an outer peripheral surface of a shaft, and at least one annular spring that presses the lip against the outer peripheral surface of the shaft, the lip being between the at least one spring and the outer peripheral surface of the shaft. The elastic member is made of an electrically conductive elastic material. A contact surface, which is a part of the lip and is in contact with the outer peripheral surface of the shaft, is straight when viewed in a cross section defined by a plane that includes a central axis of the elastic member. A width of the at least one annular spring is greater than its thickness.

14 Claims, 5 Drawing Sheets

(51) Int. Cl.
*F16J 15/3284* (2016.01)
*H02K 5/10* (2006.01)

(58) Field of Classification Search
USPC ...................................................... 310/88, 89
See application file for complete search history.

(56) References Cited

U.S. PATENT DOCUMENTS

| | | | | |
|---|---|---|---|---|
| 11,635,133 | B2 * | 4/2023 | Griesbach | F16H 57/021 277/559 |
| 12,088,157 | B2 * | 9/2024 | Griesbach | F16C 19/52 |
| 2014/0203514 | A1 | 7/2014 | Colineau et al. | |
| 2016/0305552 | A1 | 10/2016 | Maeda et al. | |
| 2022/0145936 | A1 * | 5/2022 | Sato | F16C 19/527 |
| 2022/0393544 | A1 * | 12/2022 | Fujii | B27B 17/08 |
| 2022/0393550 | A1 * | 12/2022 | Fujii | H02K 21/02 |
| 2023/0078270 | A1 * | 3/2023 | Griesbach | F16C 19/52 310/71 |
| 2024/0097536 | A1 * | 3/2024 | Zhou | H02K 11/40 |
| 2025/0020212 | A1 * | 1/2025 | Kamiya | H02K 5/124 |

FOREIGN PATENT DOCUMENTS

| | | | |
|---|---|---|---|
| JP | 2001-32947 | A | 2/2001 |
| JP | 2003-35371 | | 2/2003 |
| JP | 2003-202722 | A | 7/2003 |
| JP | 3655364 | B2 | 6/2005 |
| JP | 2014-142065 | A | 8/2014 |
| WO | WO 2015/083593 | A1 | 6/2015 |
| WO | WO 2020/226042 | A1 | 11/2020 |

OTHER PUBLICATIONS

Sato et al., English Machine Translation of WO2020226042 (Year: 2020).*
Extended European Search Report issued in European Application No. 22900911.3, dated Oct. 27, 2025.
ISR for PCT/JP2022/037858, dated Nov. 22, 2022 (w/ translation).

* cited by examiner

SEALING DEVICE AND ELECTRIC MOTOR

TECHNICAL FIELD

This disclosure relates to a sealing device and an electric motor.

BACKGROUND ART

There is known a conventional sealing device that seals an annular space between a housing with an opening and a shaft disposed in the opening. For example, the device disclosed in Patent Document 1 includes an electrically conductive seal that electrically connects a housing to a shaft.

RELATED ART DOCUMENT

Patent Document

Patent Document 1: Japanese Patent Application Laid-Open Publication No. 2014-142065

SUMMARY OF THE INVENTION

Problem to be Solved by the Invention

Rotation of an electric motor induces a current in a shaft of the motor. Electromagnetic waves generated by the induced current cause noise in devices such as AM (Amplitude Modulation) radio receivers.

In the device disclosed in Patent Document 1, electrical continuity between the housing and the shaft is unstable because a contact area between the seal and the shaft is small and prone to variation. Room remains for improving reduction of noise generated by the device disclosed in Patent Document 1.

Means for Solving the Problems

To solve the foregoing problems, a sealing device according to one aspect of this disclosure is a sealing device for disposed between a housing with an opening and a shaft within the opening, and that seals a gap between an inner peripheral surface of the housing and an outer peripheral surface of the shaft. The sealing device includes (i) an annular reinforcing ring fixed to the housing, (ii) an annular elastic member including a fixing portion fixed to the reinforcing ring, and a lip that protrudes from the fixed portion and that is slidable contact with an outer peripheral surface of the shaft, and (iii) at least one annular spring that presses the lip against the outer peripheral surface of the shaft. The lip is between the outer peripheral surface of the shaft and the at least one spring. The elastic member is made of an electrically conductive elastic material. The lip includes a contact surface in contact with the outer peripheral surface of the shaft. The contact surface is straight in a natural state when viewed in a cross section defined by a plane that includes a central axis of the elastic member.

An electric motor according to another aspect of this disclosure includes the sealing device, the housing, and the shaft.

Effect of the Invention

According to this disclosure, stable electrical continuity between the housing and the shaft is ensured.

MODES FOR CARRYING OUT THE INVENTION

Figure 1:
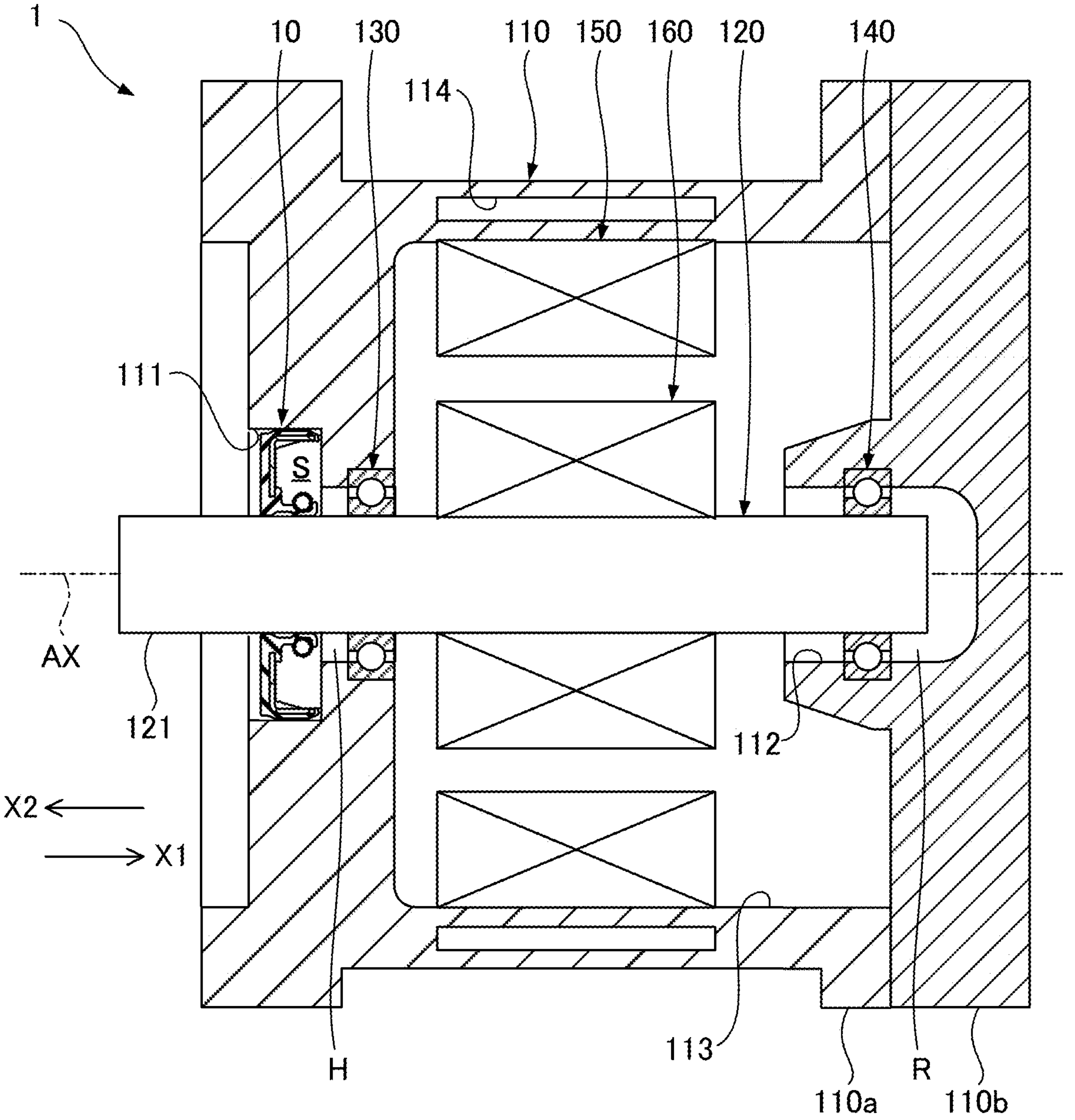
FIG. 1 is a cross-sectional view showing an electric motor according to a first embodiment.

Preferred embodiments of this disclosure will now be described below with reference to the accompanying drawings. In the drawings, depicted dimensions and scales of respective parts differ from their counterparts in practice, and some parts are depicted schematically for ease of understanding. The scope of this disclosure is not limited to these depictions unless otherwise specifically stated in the following description.

1. First Embodiment

1-1. Overview of Electric Motor

FIG. 1 is a cross-sectional view showing an electric motor 1 according to the first embodiment. FIG. 1 shows a part of a cross section of the electric motor 1 defined by a plane including an axis AX. The electric motor 1 is substantially rotationally symmetrical relative to the axis AX.

The electric motor 1 shown in FIG. 1 is a rotary-type motor and is driven by Lorentz force. For example, the electric motor 1 is used as a motor in an automobile, such as an Electric Vehicle (EV), a Hybrid Vehicle (HV), a Plug-in Hybrid Vehicle (PHV, a Fuel Cell Vehicle (FCV). Application of the electric motor 1 is not limited to a motor for use in an automobile. Examples of the application of the electric motor 1 include (i) a motor for use in a vehicle other than an automobile, (ii) a motor for use in a mobile device other than a vehicle, and (iii) a motor for use in an industrial machine, such as a construction machine, an agricultural machine, a machine tool, and a woodworking machine.

The electric motor 1 is configured to reduce induction of an electric current in a shaft 120. As shown in FIG. 1, the electric motor 1 includes a sealing device 10, a housing 110, the shaft 120, bearings 130 and 140, a stator 150, and a rotor 160.

The sealing device 10 in the electric motor 1 ensures electrical continuity between the housing 110 and the shaft 120, thereby ensuring transfer of induced current generated in the shaft 120 to the housing 110. As a result, noise caused by the induced current is reduced in a device such as an AM radio receiver. As is described below, a size of the electric motor 1 can be reduced since an installation space for the sealing device 10 can be readily secured, and a cost of installing the sealing device 10 can be reduced. First, description will be given of each part of the electric motor 1 with reference to FIG. 1.

For convenience of explanation, in some cases, a direction along the axis AX of the shaft 120 is referred to as an "axial direction." In some cases, a direction around the axis AX is referred to as a "circumferential direction." In some cases, a direction perpendicular to the axis AX is referred to as a "radial direction." In FIG. 1, directions X1 and X2 are shown, each of which represents an axial direction. The X1 direction is a direction along the axis AX from the outside of the housing 110 to the inside thereof through an opening H described below. The X2 direction is opposite to the X1 direction.

The housing 110 with the opening H is a conductive structure. It is preferable that the housing 110 be grounded to transfer an induced current from the shaft 120. The housing 110 is made of a metal material, such as iron, stainless steel, or an aluminum alloy.

The housing 110 includes a main body 110*a* and a cover 110*b*. The main body 110*a* is a bottomed cylinder and has a space for accommodating the stator 150 and the rotor 160. The opening H is at the bottom of the main body 110*a*. The opening H communicates with the space and is surrounded by an inner peripheral surface 111 along the axis AX. A bearing 130, such as a ball bearing, is fitted in the opening H.

In the example shown in FIG. 1, the main body 110*a* has a water jacket 114 in a cylindrical part of the main body 110*a*. Cooling water flows through the water jacket 114. The water jacket 114 is provided as appropriate and may be omitted.

The cover 110*b* is a plate member used to close the opening of the main body 110*a*. There is a recessed portion R on a surface of the cover 110*b* facing in the direction X2. The recessed portion R communicates with the space in the main body 110*a* and includes an inner peripheral surface 112 along the axis AX. The recessed portion R includes an inner peripheral surface 112 into which an outer peripheral surface of a bearing 140, such as a ball bearing, is fitted.

The shape of the housing 110 is not limited to the example shown in FIG. 1 and may be freely chosen. The material of the housing 110 is not limited to a metal material, as long as the material is conductive and imparts sufficient rigidity to the housing 110. The material of the housing 110 may be obtained by mixing or laminating (i) a conductive material, such as a metal material, and (ii) an insulating material, such as a resin or ceramic material.

The shaft 120 is a conductive rod member that includes an outer peripheral surface 121 along the axis AX. The shaft 120 is within the opening H of the housing 110 and is rotatably supported around the axis AX relative to the housing 110 via the bearings 130 and 140. The shaft 120 is made of a metal material, such as iron, stainless steel, or an aluminum alloy. The outer peripheral surface 121 has a smaller diameter than the inner peripheral surface 111 of the opening H of the housing 110, resulting in an annular space S between the outer peripheral surface 121 and the inner peripheral surface 111. In the example shown in FIG. 1, the outer diameter of the shaft 120 is constant in the axial direction.

The material of the shaft 120 is not limited to a metal material as long as the shaft 120 is conductive and has sufficient rigidity. The shape of the shaft 120 is not limited to the example shown in FIG. 1. The shaft 120 may include a part with an outer diameter that differs from the other part. The shaft 120 may be either solid or hollow.

The stator 150 may be fitted to the housing 110 or may be fixed to the housing 110 by an appropriate medium, for example, by an adhesive. The stator 150 is a coil disposed in the direction of the circumference of the main body 110*a*, for example. The rotor 160 may be fitted to the shaft 120 or may be fixed to the shaft 120 by an appropriate medium, for example, by an adhesive. For example, the rotor 160 is a permanent magnet. The stator 150 and the rotor 160 generate a rotational moment around the axis AX of the shaft 120 by Lorentz force.

The sealing device 10 is an annular structure and is disposed in the space S between the inner peripheral surface 111 of the opening H of the housing 110 and the outer peripheral surface 121 of the shaft 120. The sealing device 10 seals the space S between the housing 110 and the shaft 120, and ensures electrical continuity between the housing 110 and the shaft 120.

The sealing device 10 is electrically conductive and is in contact with the housing 110 and the shaft 120. The sealing device 10 is disposed between the housing 110 and the shaft 120, thereby electrically connecting the housing 110 to the shaft 120. By the electrical connection induced current generated in the shaft 120 is transferred to the housing via the sealing device 10, and an induced current generated in the shaft 120 is reduced. As a result, noise in a device, such as an AM radio receiver in the vicinity of the electric motor 1 is reduced. Further, reduction of the induced current can reduce a potential difference between the housing 110 and the shaft 120. For example, damage to the bearing that supports the shaft 120 can be reduced by the reduction in potential difference, and a deterioration of grease in the bearing can also be reduced.

1-2. Parts of the Sealing Device

Figure 2:
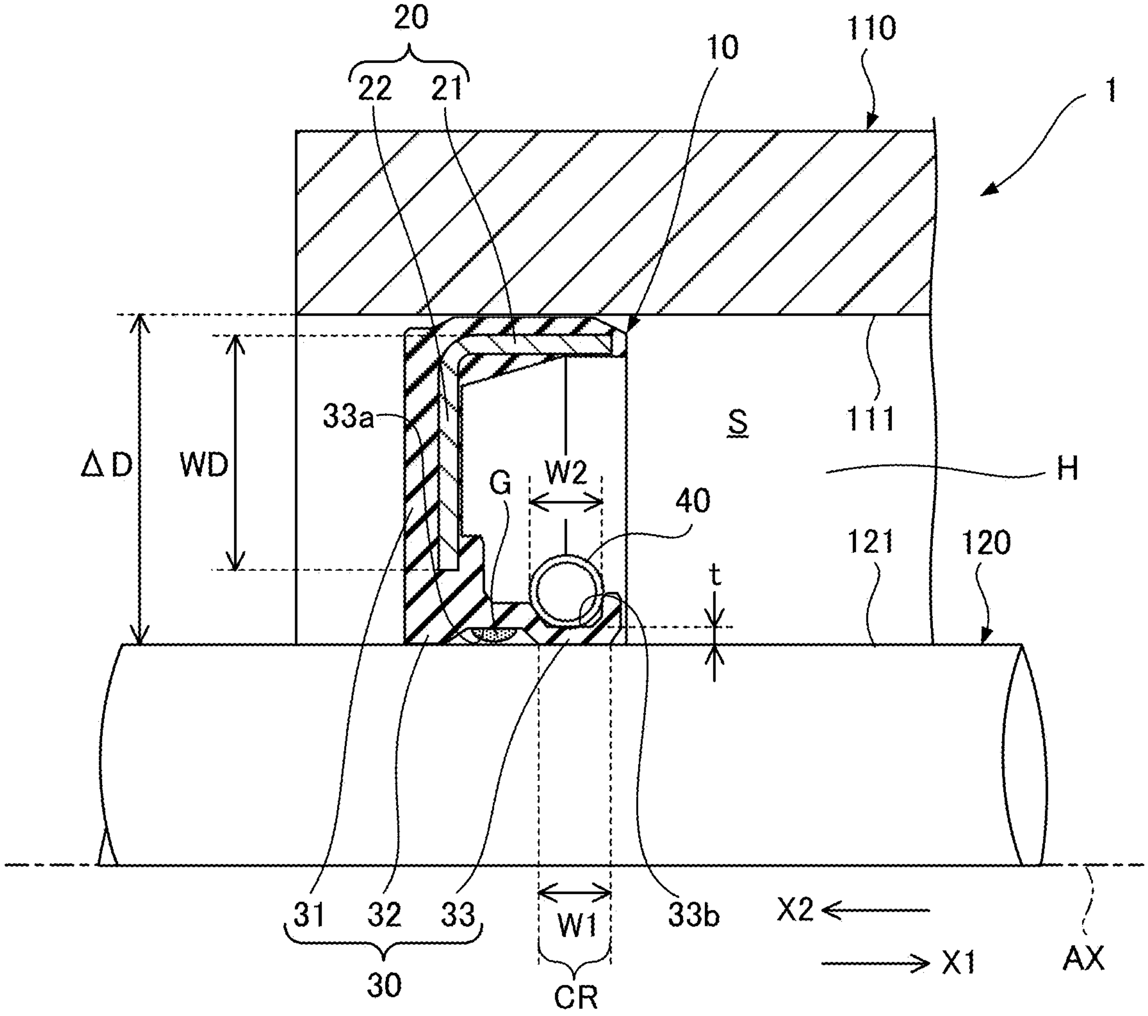
FIG. 2 is a cross-sectional view showing a sealing device according to the first embodiment.
Figure 3:
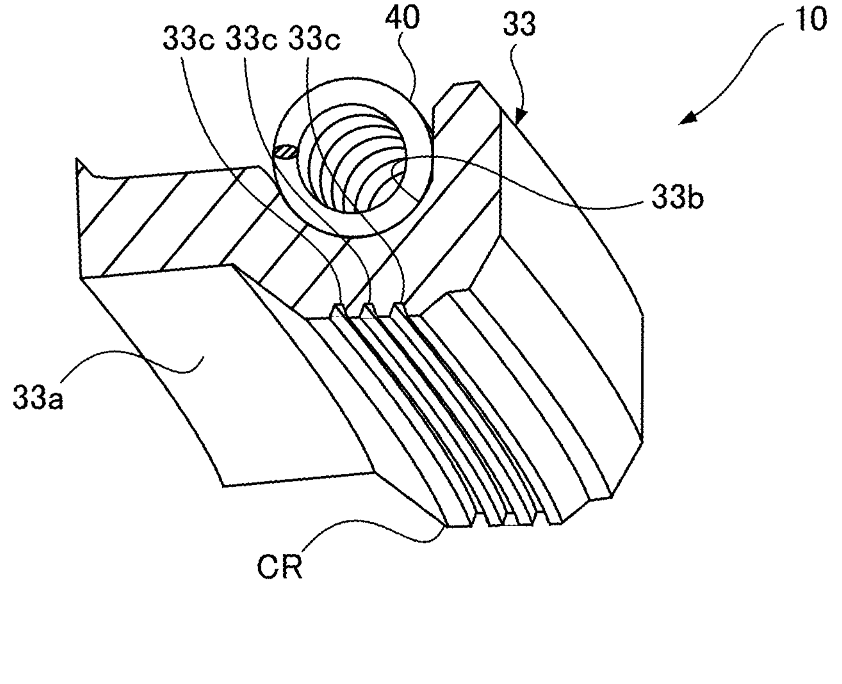
FIG. 3 is a perspective view showing a part of the sealing device according to the first embodiment.

FIG. 2 is a cross-sectional view showing the sealing device 10 according to the first embodiment. FIG. 3 is a perspective view showing a part of the sealing device 10 according to the first embodiment. As shown in FIG. 2, the sealing device 10 includes a reinforcing ring 20, an elastic member 30, and a spring 40.

The reinforcing ring 20 is an annular member that reinforces the elastic member 30 around the axis AX. The reinforcing ring 20 is disposed along the inner peripheral surface 111 of the opening H of the housing 110. The reinforcing ring 20 is made of a material with Young's modulus higher than the elastic member 30 in terms of securing the rigidity, strength, etc., necessary for the reinforcing ring 20. Specifically, the reinforcing ring 20 is made of a metal material, such as stainless steel or Steel Plate Cold Commercial (SPCC). In this case, the reinforcing ring 20 is manufactured by, for example, press working or forging.

The reinforcing ring 20 is electrically conductive, and reduces an electrical resistance of the sealing device 10 compared with an insulating reinforcing ring 20.

The material of the reinforcing ring 20 is not limited to a metal material, and may be a conductive ceramic or resin material, as long as the reinforcing ring 20 is electrically conductive. Alternatively, the reinforcing ring 20 may be made of an insulating material that is not electrically conductive. In such a case, the electrical conductivity of the sealing device 10 can still be ensured because the elastic member 30 is electrically conductive, as will be described below. Examples of the insulating material include resinous materials, such as polyether ether ketone (PEEK), polyphenylene sulfide (PPS), and polytetrafluoroethylene (PTFE). However, the insulating material is not limited thereto. The resin material may contain a fiber base material, such as glass fiber, organic fiber, metal fiber, carbon fiber, or mineral fiber, as needed. Alternatively, the resin material may contain particulate fillers composed of (i) a metal oxide, such as alumina (ii) a metal hydroxide, such as aluminum hydroxide, or (iii) a nitride, such as boron nitride, as appropriate. If the reinforcing ring 20 is made of a resin material, the reinforcing ring 20 is formed by, for example, injection molding.

The reinforcing ring 20 is L-shaped when viewed in a cross section defined by a plane including the axis AX. As shown in FIG. 2, the reinforcing ring 20 includes a first portion 21 and a second portion 22. The first portion 21 is cylindrical along the inner peripheral surface 111 of the opening H of the housing 110. The second portion 22 is planar circumferentially and projects radially inward from one axial end of the first portion 21. In the example shown in FIG. 2, the second portion 22 is connected to the end of the first portion 21 in the X2 direction and extends in a direction perpendicular to the axis AX.

When viewed in the cross section defined by the plane including the axis AX, the direction of extension of the first portion 21 and the direction of extension of the second portion 22 are not limited to the example shown in FIG. 2 and may intersect with each other. However, to provide sufficient stiffness of the reinforcing ring 20, it is preferable that the first portion 21 and the second portion 22 extend perpendicular to each other when viewed in the cross section defined by the plane including the axis AX. A cross-sectional shape of the reinforcing ring 20 is not limited to the example shown in FIG. 2. The shape may be obtained by omitting either one of the first and second portions 21 and 22.

Stable installation of the reinforcing ring 20 is attained by a configuration in which the first portion 21 extends axially, in contrast to a configuration in which the first portion 21 is omitted. It is preferable that when viewed radially, the first portion 21 overlap at least a part of a contact area between the housing 110 and the elastic member 30. This is because the reinforcing ring 20 is electrically conductive and electrical continuity between the reinforcing ring 20 and the housing 110 is thereby improved.

In the example shown in FIG. 2, an axial width of the reinforcing ring 20 or the first portion 21 is greater than an axial length of the contact area. When viewed radially, the contact area between the housing 110 and the elastic member 30 is included in the first portion 21. As a result, electrical continuity between the contact area and the reinforcing ring 20 can be improved as compared with a configuration in which the first portion 21 overlaps a part of the contact area when viewed radially.

In the reinforcing ring 20, the second portion 22 extends radially. Thus, in addition to stable installation of the reinforcing ring 20 by way of the first portion 21, stable installation of the elastic member 30 is also attained as compared to a configuration in which the second portion 22 is omitted. Further, the reinforcing ring 20 is electrically conductive, and the second portion 22 extends radially. As a result, electrical conductivity is enhanced in the radial direction of the sealing device 10.

Preferably, WD/ΔD is 0.5 or more and 0.9 or less. More preferably, the WD/ΔD is 0.6 or more and 0.8 or less. Where WD is a width of the reinforcing ring 20 or the second portion 22 in the radial direction of the shaft 120, and ΔD is a distance between the inner peripheral surface 111 of the housing 110 and the outer peripheral surface 121 of the shaft 120. Since the WD/ΔD is within such a range, it is possible to stabilize a contact of the elastic member 30 relative to the outer peripheral surface 121 of the shaft 120, as well as to reduce the electrical resistance in the radial direction of the sealing device 10. If the WD/ΔD is too small, it is difficult to sufficiently reduce electrical resistance in the radial direction of the sealing device 10 by the conductive reinforcing ring 20. In addition, variation in the posture of the elastic member 30 tends to occur depending on a shape or the like of the elastic member 30. In contrast, if the WD/ΔD is too great, a sliding resistance of the sealing device 10 relative to the shaft 120 may increase or vary depending on the eccentricity of the shaft 120 or the like.

The elastic member 30 is an annular elastic member that is fixed to the reinforcing ring 20 and is in contact with the inner peripheral surface 111 of the housing 110 and the outer peripheral surface 121 of the shaft 120. The elastic member 30 is fixed to the inner peripheral surface 111 by press-fitting together with the reinforcing ring 20. The shaft 120 is inserted inside the elastic member 30.

The elastic member 30 is made of an elastic material, such as an electrically conductive rubber composition. A volume resistivity of the elastic material is not particularly limited but is preferably 100 Ωcm or less. The elastic material includes a rubber material and a conductivity-imparting agent. For example, the elastic member 30 is formed by insert molding with the reinforcing ring 20 being an insert article. By the insert molding, the elastic member 30 is bonded to the reinforcing ring 20 by vulcanization adhesion.

Examples of the rubber material include a synthetic rubber, such as nitrile rubber (NBR), hydrogenated nitrile rubber (H-NBR), acrylic rubber (ACM), fluororubber (FKM), and silicone rubber. From among these, one may be used alone, or more than one may be combined as a copolymer or a blend. However, the rubber material is not limited thereto.

The rubber material is not limited to synthetic rubber and may be a thermoplastic elastomer. An additive, such as a crosslinking agent or a crosslinking aid, is added to the rubber material as appropriate. Examples of the crosslinking agent include sulfur and a peroxide vulcanizing agent. However, the crosslinking agent is not particularly limited thereto. Examples of the crosslinking aid include inorganic zinc oxide, magnesium oxide, organic stearic acid, and amines.

Examples of the conductivity-imparting agent include an electron conductivity-imparting agent and an ion conductivity-imparting agent. From among these, more than one may be combined by, for example, mixing. However, the conductivity-imparting agent is not limited thereto. Examples of the electron conductivity-imparting agent include conductive particles, such as carbon black and metal powder. From among these, one agent may be used alone, or more than one agent may be combined. However, the electron conductivity-imparting agent is not particularly limited thereto. Examples of the ionic conductivity-imparting agent include organic salt, inorganic salt, metal complex, and ionic liquid. However, the ionic conductivity-imparting agent is not limited thereto. Examples of the organic salts include sodium trifluoride acetate. Examples of the inorganic salts include lithium perchlorate and quaternary ammonium salts. Examples of the metal complex include ferric halide-ethylene glycol as recited in Japanese Patent No. 3655364. The ionic liquid is molten salt, which is liquid at room temperature and has a melting point of 70° C. or less, as recited in Japanese Patent Application Laid-Open Publication No. 2003-202722. It is preferred that the melting point be 30° C. or less.

As shown in FIG. 2, the elastic member 30 includes a fixed portion 31, a protruding portion 32, and a lip 33, which are unitary and are made of the aforementioned elastic material.

The fixed portion 31 is an annular portion of the elastic member 30 that is fixed to the reinforcing ring 20 around its entire circumference. The fixed portion 31 is bonded to the reinforcing ring 20 by, for example, vulcanization bonding.

In the example shown in FIG. 2, the fixed portion 31 includes the reinforcing ring 20 and is provided along the reinforcing ring 20. Thus, the reinforcing ring 20 is embedded in the fixed portion 31. The fixed portion 31 includes a part that is disposed on the outer peripheral surface of the first portion 21 of the reinforcing ring 20. The part is in contact with the inner peripheral surface 111 of the housing 110. The fixed portion 31 is inserted into the opening H of the housing 110 with a predetermined tightening allowance. The fixed portion 31 has an outer diameter that is slightly greater than an inner diameter of the opening H of the housing 110 when the fixed portion 31 is not inserted into the opening H (natural state). Upon insertion into the opening H the fixed portion 31 elastically deforms between the inner peripheral surface 111 and the reinforcing ring 20. As a result, the fixed portion 31 is fixed to the housing 110 in close contact with the inner peripheral surface 111. The contact between the housing 110 and the elastic member 30 is thereby made stable.

The protruding portion 32 is a part of the elastic member 30 and protrudes radially inward from the fixed portion 31. The protruding portion 32 slidably contacts the outer peripheral surface 121 of the shaft 120. The contact ensures electrical continuity between the shaft 120 and the elastic member 30. It is preferable that the protruding portion 32 is in contact with the outer peripheral surface 121 of the shaft 120 over the entire circumference. In this case, conductivity between the shaft 120 and the elastic member 30 can be increased as compared with a configuration in which the protruding portion 32 is in partial contact with the outer peripheral surface 121 of the shaft 120. Further, as compared with the configuration, in which the protruding portion 32 is in partial contact with the outer peripheral surface 121 of the shaft 120, leakage of a lubricant G disposed in the recessed portion 33*a*, which will be described below is reduced. In addition, entry of foreign matter between the lip 33 and the outer peripheral surface 121 of the shaft 120 is reduced.

In the example shown in FIG. 2, the protruding portion 32 has a width reduces toward its tip. The tip of the protruding portion 32 is in slidable contact with the outer peripheral surface 121 of the shaft 120. As compared with the protruding portion 32 that has a constant width, the protruding portion 32 easily deforms to follow the outer peripheral surface 121 in accordance with eccentricity of the shaft 120. This advantage provides effects of maintaining contact over an entire circumference of the protruding portion 32 with the outer peripheral surface 121 of the shaft 120.

The shape of the protruding portion 32 is not limited to the example shown in FIG. 2. The protruding portion 32 may have a constant width, or may extend in a direction in which the protruding portion 32 is inclined with respect to the radial direction. Further, as will be described below, the electrical continuity between the elastic member 30 and the shaft 120 is ensured by the contact between the lip 33 and the outer peripheral surface 121. For this reason, the protruding portion 32 may be provided in contact with a circumferential part of the outer peripheral surface 121 of the shaft 120. Alternatively, the protruding portion 32 may be omitted.

The lip 33 is a part of the elastic member 30 that is entirely circumferential and that protrudes from the fixed portion 31 in the X1 direction. The lip 33 is in slidable contact with the outer peripheral surface 121 of the shaft 120 at a different axial position from the protruding portion 32. The contact ensures electrical continuity between the shaft 120 and the elastic member 30. The lip 33 is in contact over the entire circumference of the outer peripheral surface 121 of the shaft 120. As a result, conductivity between the shaft 120 and the elastic member 30 can be increased as compared with a configuration in which the lip 33 is in partial contact with the outer peripheral surface 121 of the shaft 120.

Further, leakage of the lubricant G disposed in the recessed portion 33*a* described below can be reduced, as compared with the configuration, in which the lip 33 is in partial contact with the outer peripheral surface 121 of the shaft 120.

The lip 33 is provided with a contact surface CR on an inner peripheral surface of the lip 33. The contact surface CR is in contact with the outer peripheral surface 121 of the shaft 120. As shown in FIG. 3, the contact surface CR is straight in its natural state when viewed in the cross section defined by the plane including the axis AX. The phrase "natural state of the contact surface CR" refers to a state in which (i) the sealing device 10 is not installed in the electric motor 1, and (ii) the spring 40 is not attached to the elastic member 30, and no external force is applied to the contact surface CR. The term "straight" refers to a substantially straight shape, but may include fine concavities or convexities. Preferably, the contact surface CR refers to a surface that extends in a direction along the axis AX in its natural state. That is, the contact surface CR refers to a surface that as a straight line is parallel to the axis AX.

As shown in FIG. 3, the contact surface CR is provided with grooves 33*c* that extend circumferentially. Each of the grooves 33*c* holds a lubricant G. In the example shown in FIG. 3, the grooves 33*c* are provided over the entire circumference. However, the grooves 33*c* may be provided intermittently over the circumference. The number of the grooves 33*c* is not limited to the example shown in FIG. 3, and may be one, two, or four or more. A shape of each groove 33*c* is not limited to the example shown in FIG. 3. A groove 33*c* may have a width that differs from other of the grooves 33*c*. Alternatively, a groove 33*c* may have a portion that differs from a like portion of another groove 33*c*. The grooves 33*c* are provided as appropriate and may be omitted.

As shown in FIGS. 2 and 3, the lip 33 is provided with a recessed portion 33*a* on the inner peripheral surface of the lip 33. The recessed portion 33*a* is entirely circumferential and extends between the contact surface CR and the protruding portion 32. The recessed portion 33*a* defines a space between the elastic member 30 and the outer peripheral surface 121 of the shaft 120. In the example shown in FIG. 2, the recessed portion 33*a* holds a lubricant G.

The lubricant G is, for example, a conductive grease, and includes a base oil, a thickener, and a conductivity-imparting agent. Examples of the thickener include (i) a soap, such as calcium soap, calcium complex soap, sodium soap, aluminum soap, lithium soap, and lithium complex soap, and (ii) a non-soap, such as polyurea, sodium terephthalate, polytetrafluoroethylene (PTFE), organic bentonite, and silica gel. From among these, one alone may be used, or more than one in combination may be used. Examples of the base oil include (i) a mineral oil (refined mineral oil), such as paraffinic and naphthenic oil, and (ii) synthetic oil, such as polyolefin, ester, and silicone. From among these, one alone may be used, or more than one in combination may be used. Examples of the conductivity-imparting agent include conductive particles, such as carbon black, metal powder, and metal oxide powder. For example, the carbon black used for the lubricant G is a colloidal fine powder of carbon, which is obtained by incomplete combustion or thermal decomposition of hydrocarbons, and functions as a thickener for the lubricant G. For example, the metal powder used for the lubricant G is a powder composed of a metal, such as silver or nickel. For example, the metal oxide powder used for the lubricant G is powder composed of a metal oxide, such as titanium oxide, tin oxide, or indium oxide. The foregoing conductive particles may be used alone or in a combination of two or more.

The lubricant G includes a base oil, a thickener, and a conductivity-imparting agent, as well as a variety of additives, as appropriate. The lubricant G is not limited to a grease and may be a lubricant oil or a solid lubricant. As a lubricating oil, the lubricant G includes a base oil and a conductivity-imparting agent without a thickener. As a solid lubricant, the lubricant G includes conductive particles, such as carbon black, metal powder or metal oxide powder. Preferably, the lubricant G is a grease, since it remains largely at a desired position on the elastic member 30.

The lip 33 is provided with a recessed portion 33*b* on the outer peripheral surface of the lip 33. The spring 40 is disposed on the recessed portion 33*b*. The recessed portion 33*b* is a groove that extends over the entire circumference. The recessed portion 33*b* prevents the spring 40 from shifting axially.

Where W1 is a width of the contact surface CR in the axial direction of the shaft 120, and W2 is a width of the spring 40 in the axial direction of the shaft 120, a relationship of W1>W2 is met. If an area of the contact surface CR is greater than that in a case of the relationship of W1<W2 being met, an electrical resistance between the shaft 120 and the lip 33 may be reduced. The induced current generated in the shaft 120 is transferred to the lip 33.

Where t is a thickness of a part of the lip 33 between the spring 40 and the outer peripheral surface 121 of the shaft 120, and W1 is a width of the contact surface CR in the axial direction of the shaft 120, a relationship of t<W1 is met, and preferably, a relationship of 2×t<W1 is met. When such relationships of the thickness t and the width W1 are met, the electrical conductivity between the sealing device 10 and the shaft 120 can be increased in contrast to when the relationships are not met. This is because as the thickness t decreases, a tightening force of the spring 40 is more likely to be transmitted to the contact surface CR, and the adhesiveness between the lip 33 and the shaft 120 increases. As a result, an electrical resistance between the lip 33 and the shaft 120 decreases.

Further, when a relationship of t<W2 is met, a tightening force by the spring 40 is transmitted to the contact surface CR with ease as compared to when a relationship of t>W2 is met.

The spring 40 is an annular or endless coil spring that presses the lip 33 against the outer peripheral surface 121. The lip 33 is between the spring 40 and the outer peripheral surface 121. In the example shown in FIGS. 2 and 3, the spring 40 has identical axial and radial widths in cross section. More specifically, the spring 40 is circular.

The spring 40 is disposed in the recessed portion 33*b*, which prevents the spring 40 from shifting axially. Further, the spring 40 is disposed in the recessed portion 33*b* in an elastically deformed state such that its diameter expands. Due to a restoring force caused by the elastic deformation, the lip 33 is pressed by the spring 40 against the outer peripheral surface 121 of the shaft 120. The spring 40 is made of a steel material, such as stainless steel, for example.

The spring 40 is electrically conductive, thereby reducing an electrical resistance of the sealing device 10 as compared with an insulating spring 40.

The sealing device 10 is disposed between the housing 110 with the opening H and the shaft 120 disposed in the opening H. The sealing device 10 electrically connects the housing 110 and the shaft 120. As described above, the sealing device 10 includes the annular reinforcing ring 20, an annular elastic member 30, and at least one annular spring 40.

The reinforcing ring 20 is fixed to the housing 110. The elastic member 30 includes the fixed portion 31 that is fixed to the reinforcing ring 20, and the lip 33 that protrudes from the fixed portion 31 and that is in slidable contact with the outer peripheral surface 121 of the shaft 120. The spring 40 presses the lip 33 against the outer peripheral surface 121 of the shaft 120. The lip 33 is between the spring 40 and the outer peripheral surface 121 of the shaft 120.

The elastic member 30 is made of an electrically conductive elastic material. Moreover, the contact surface CR, which is a part of the lip 33 and is in contact with the outer peripheral surface 121 of the shaft 120, is straight in its natural state when viewed in the cross section defined by the plane including the axis AX that is the central axis of the elastic member 30.

Since the elastic member 30 is made of an electrically conductive elastic material, the sealing device 10 ensures electrical continuity between the housing 110 and the shaft 120 via the elastic member 30. Moreover, the cross-sectional shape of the contact surface CR, which is a part of the lip 33 and is in contact with the outer peripheral surface 121 of the shaft 120, is straight in its natural state. By this configuration, the area of the contact surface CR is increased, thereby increasing the electrical conductivity between the shaft 120 and the elastic member 30. That is, electrical resistance between the shaft 120 and the elastic member 30 is decreased. As a result, the electrical continuity between the housing 110 and the shaft 120 is sufficiently ensured. Since the lip 33 is pressed against the outer peripheral surface 121 of the shaft 120, variations in the contact surface CR are reduced, and the electrical continuity between the housing 110 and the shaft 120 is kept stable.

Use of the sealing device 10 provides a structure for fixing the elastic member 30 to the housing 110 that is simpler than that provided by use of the conductive brush recited in Patent Document 1. This is because the elastic member 30 is fixed to the housing 110 via the reinforcing ring 20. Thus, an installation space for the sealing device 10 can be readily secured, and a cost for installation of the sealing device 10 can be reduced.

In this embodiment, as described above, the contact surface CR is provided with at least one groove 33*c* that extends in the circumferential direction of the shaft 120. The groove 33*c* holds the conductive lubricant G. The lubricant G reduces sliding resistance of the lip 33 relative to the outer peripheral surface 121 of the shaft 120. Further the lubricant G is held in the groove 33*c* provided on the contact surface CR. The lubricant G reduces the sliding resistance of the lip 33 relative to the outer peripheral surface 121 of the shaft 120, even if the width W1 of the contact surface CR, which is a part of the lip 33 and is in contact with the outer peripheral surface 121 of the shaft 120, is large. Further, the lubricant G is electrically conductive. Even if the lubricant G is interposed between the lip 33 and the shaft 120, higher conductivity between the lip 33 and the shaft 120 can be attained as compared with use of an insulating lubricant.

As described above, the elastic member 30 further includes the protruding portion 32 that protrudes from the fixed portion 31 in a direction that differs from the lip 33. The protruding portion 32 is in contact with the outer peripheral surface 121 of the shaft 120 at a different position from the lip 33 in the axial direction of the shaft 120. Such contact between the protruding portion 32 and the shaft 120 ensures electrical continuity between the shaft 120 and the elastic member 30. Thus, electrical resistance between the shaft 120 and the elastic member 30 is reduced compared to a configuration in which the protruding portion 32 is omitted.

As described above, the elastic member 30 is provided with the recessed portion 33*a* to define a space surrounded by the outer peripheral surface 121 of the shaft 120, the lip 33, and the protruding portion 32. The recessed portion 33*a* holds the electrically conductive lubricant G. The lubricant G can be supplied from the inside of the recessed portion 33*a* to (i) the contact surface of the shaft 120 relative to the outer peripheral surface 121 and (ii) the contact surface CR. As a result, the effect of supply of the lubricant G can be maintained over a long period of time.

2. Second Embodiment

The second embodiment according to this disclosure will now be described below. In the following embodiment, elements having the same operations or functions as in the first embodiment will be referred to by the same reference signs used in the first embodiment and detailed description thereof will be omitted, as appropriate.

Figure 4:
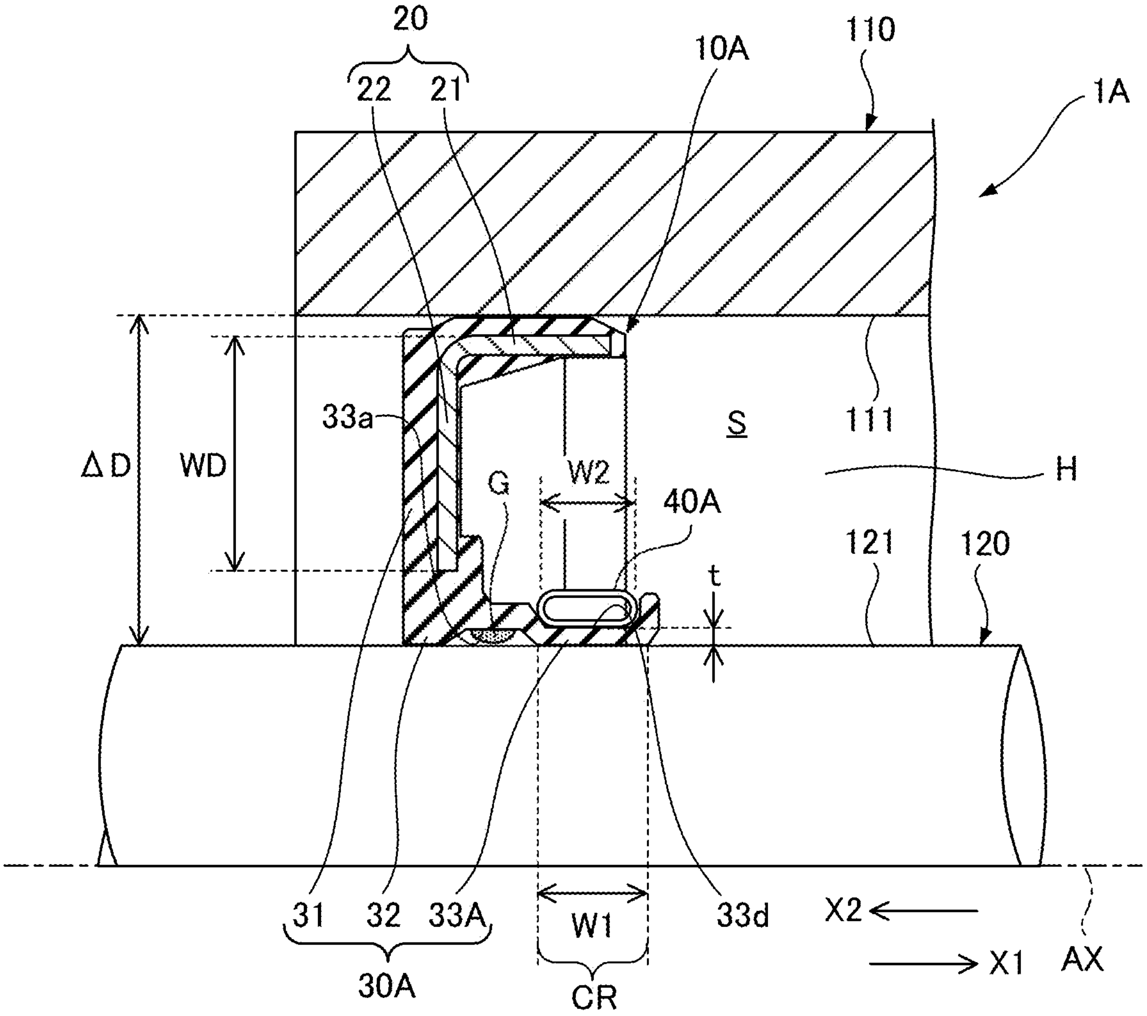
FIG. 4 is a cross-sectional view showing a sealing device according to a second embodiment.

FIG. 4 is a cross-sectional view showing a sealing device 10A according to the second embodiment. A configuration of an electric motor 1A is the same as that of the electric motor 1 according to the first embodiment except that a sealing device 10A is provided instead of the sealing device 10. A configuration of the sealing device 10A is the same as that of the sealing device 10 except that an elastic member 30A and a spring 40A are provided instead of the elastic member 30 and the spring 40.

A configuration of the elastic member 30A is the same as that of the elastic member 30 except that a lip 33A is provided instead of the lip 33. A configuration of the lip 33A is the same as that of the lip 33 except that (i) a recessed portion 33*d* is provided instead of the recessed portion 33*b*, and (ii) the width W1 of the contact surface CR is greater than that of the lip 33. The recessed portion 33*d* has an axial width greater than the recessed portion 33*b*. The spring 40A is disposed in the recessed portion 33*d*.

The spring 40A is an annular or endless coiled spring that presses the lip 33A against the outer peripheral surface 121. The lip 33A is between the spring 40A and the outer peripheral surface 121. In the example shown in FIG. 4, the spring 40A is radially flat when viewed in cross section. More specifically, an outer shape of the spring 40A includes (i) a pair of axial sides, and (ii) a pair of convex curved sides, ends of each of which are connected to respective adjacent ends of the pair of axial sides. The spring 40A has an axial width greater than its radial width. Preferably, the axial width of the spring 40A is 2 times or more and 4 times or less of its radial width.

According to the second embodiment, the sealing device 10A ensures the electrical continuity between the housing 110 and the shaft 120. As in the first embodiment, an installation space for the sealing device 10A can be readily secured, and a cost of installation of the sealing device 10A can be reduced. In this embodiment, as described above, the sealing device 10A includes the spring 40A. The spring 40A is flat in the radial direction of the shaft 120. As compared with a circular cross-sectional spring 40, even if an area of the contact surface CR of the lip 33A relative to the outer peripheral surface 121 of the shaft 120 is increased, an axial tightening force caused by the spring 40A can be efficiently transmitted to the contact surface CR in wide range. By increasing adherence between the lip 33A and the shaft 120, electrical resistance between the lip 33A and the shaft 120 is reduced, and as a result, an induced current generated in the shaft 120 can be transferred to the lip 33A.

3. Third Embodiment

Third embodiment according to this disclosure will now be described below. In the following embodiment elements having the same operations or functions in this embodiment as in the first embodiment will be referred to by the same reference signs used in the first embodiment and detailed description thereof will be omitted, as appropriate.

Figure 5:
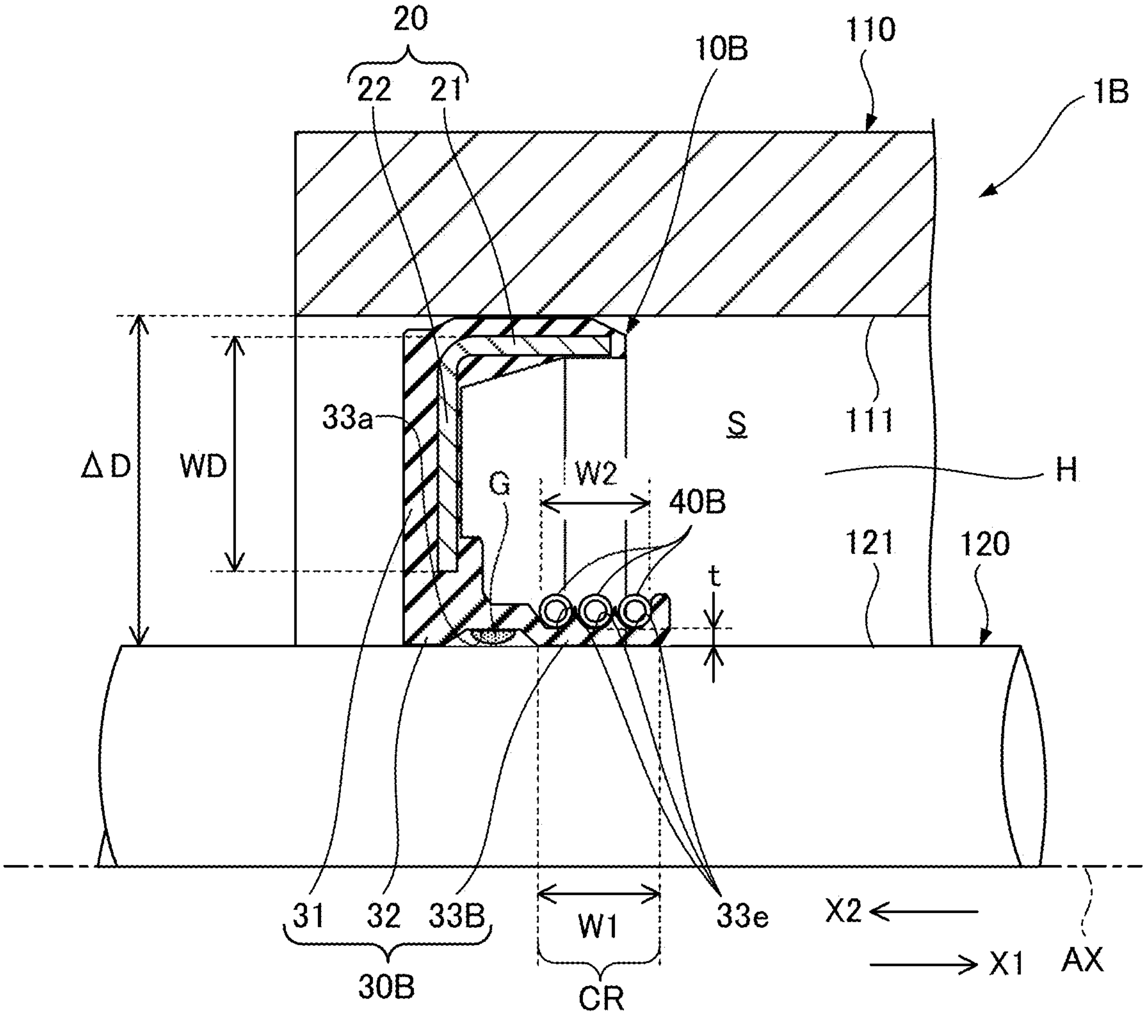
FIG. 5 is a cross-sectional view showing a sealing device according to a third embodiment.

FIG. 5 is a cross-sectional view showing a sealing device 10B according to the third embodiment. A configuration of an electric motor 1B is the same as that of the electric motor 1 according to the first embodiment except that the sealing device 10B is provided instead of the sealing device 10. A configuration of the sealing device 10B is the same as that of the sealing device 10 except that an elastic member 30B and more than one spring 40B are provided instead of the elastic member 30 and the spring 40.

A configuration of the elastic member 30B is the same as that of the elastic member 30 except that a lip 33B is provided instead of the lip 33. A configuration of the lip 33B is the same as that of the lip 33 expect that (i) more than one recessed portion 33*e* is provided instead of the recessed portion 33*b*, and (ii) a width W1 of the contact surface CR is greater than that of the lip 33. The recessed portions 33*e* are arranged axially. The springs 40B are disposed in the respective recessed portions 33*e*. FIG. 5 shows an example of three recessed portions 33*e*. The number of the recessed portions 33*e* is determined in accordance with the number of the springs 40B and is not limited to the example shown in FIG. 5. The number of the recessed portions 33*e* may be two or four or more.

Each spring 40B is an annular or endless coiled spring that presses the lip 33B against the outer peripheral surface 121. The lip 33B is between the spring 40B and the outer peripheral surface 121. In the example shown in FIG. 5, the spring 40B is circular when viewed in cross section. FIG. 5 shows an example of three springs 40B. The number of the springs 40B is not limited to the example shown in FIG. 5 and may be two or four or more. An axial width W2 refers to a total axial length of a set of the springs 40B included in the sealing device 10B. In this embodiment, the axial length of the set of three springs 40B is the width W1.

According to the third embodiment, the sealing device 10B ensures electrical continuity between the housing 110 and the shaft 120. As in the first embodiment, an installation space for the sealing device 10B can be readily secured, and a cost of installation of the sealing device 10B can be reduced. In this embodiment, as described above, the sealing device 10B includes more than one spring 40B that is arranged along the axial direction of the shaft 120. As compared with a single spring 40, even if an area of the contact surface CR of the lip 33B relative to the outer peripheral surface 121 of the shaft 120 is increased, an axial tightening force caused by the spring 40B can be efficiently transmitted to the contact surface CR over a wide range. Increasing adherence between the lip 33B and the shaft 120 enables electrical resistance between the lip 33B and the shaft 120 to be reduced, and, as a result, an induced current generated in the shaft 120 can be transferred to the lip 33B.

4. Modifications

The foregoing embodiments exemplified above may be modified. Specific modes of modification applicable to the embodiments will be exemplified below. More than one mode freely selected from the following examples may be combined, as appropriate, as long as such combination does not give rise to any conflict.

4-1. Modification 1

The foregoing embodiments provide an example of a configuration in which the reinforcing ring 20 is embedded in the elastic member 30, 30A, or 30B, but are not limited thereto. A part of the reinforcing ring 20 may be exposed from the elastic member 30, 30A, or 30B. In this case, the elastic member 30, 30A, or 30B may be composed of two members spaced apart from each other. An electrical continuity between the two members is ensured via the reinforcing ring 20.

4-2. Modification 2

The foregoing embodiments provide an example of a configuration in which the elastic member 30, 30A, or 30B is in contact with the housing 110, but are not limited thereto. The elastic member 30, 30A, or 30B may not be in contact with the housing 110. In this case, the reinforcing ring 20 may include a part exposed from the elastic member 30, 30A, or 30B such that the reinforcing ring 20 is in contact with the housing 110. As an electrically conductive reinforcing ring 20, the reinforcing ring 20 is in contact with the housing 110, thereby substantially reducing electrical resistance between the housing 110 and the sealing device 10, 10A or 10B. If the elastic member 30, 30A, or 30B is in contact with the housing 110 as in the foregoing embodiments, electric resistivity between the housing 110 and the sealing device 10A or 10B is more easily stabilized as compared with a configuration in which the reinforcing ring 20 is in contact with the housing 110.

4-3. Modification 3

The foregoing embodiments provide an example of a configuration in which the sealing device 10, 10A, or 10B is directly fixed to the housing 110, but are not limited thereto. A member, such as a spacer, may be interposed between the housing 110 and the sealing device 10, 10A, or 10B. The member may be regarded as a part of the housing 110 because the member is fixed to the housing 110.

4-4. Modification 4

The foregoing embodiments provide an example of a configuration in which the sealing device 10, 10A, or 10B is in direct contact with the housing 110 and the outer peripheral surface of the shaft 120 but are not limited thereto. The sealing device 10, 10A, or 10B may be in contact with a member, such as a sleeve fixed to the shaft 120. The member may be regarded as a part of the shaft 120 because the member is fixed to the shaft 120.

DESCRIPTION OF REFERENCE SIGNS

1, 1A and 1B . . . electric motor, 10, 10A and 10B . . . sealing device, 20 . . . reinforcing ring, 21 . . . first portion, 22 . . . second portion, 30, 30A and 30B . . . elastic member, 31 . . . fixed portion, 32 . . . protruding portion, 33, 33A and 33B . . . lip, 33*a* and 33*b* . . . recessed portion, 33*c* . . . grooves, 33*d* and 33*e* . . . recessed portion, 40, 40A and 40B . . . spring, 110 . . . housing, 110*a* . . . main body, 110*b* . . . cover, 111 . . . inner peripheral surface, 112 . . . inner peripheral surface, 114 . . . water jacket, 120 . . . shaft, 130 and 140 . . . bearing, 150 . . . stator, 160 . . . rotor, 121 . . . outer peripheral surface, AX . . . axial, CR . . . contact surface, G . . . lubricant, H . . . opening, S . . . space, R . . . recessed portion, W1, W2 and WD . . . width, t . . . thickness, and ΔD . . . distance.

The invention claimed is:

1. A sealing device disposed between a housing with an opening and a shaft within the opening, and that seals a gap between an inner peripheral surface of the housing and an outer peripheral surface of the shaft, the sealing device comprising:

an annular reinforcing ring fixed to the housing;

an annular elastic member comprising:

a fixing portion fixed to the reinforcing ring; and a lip that protrudes from the fixing portion and is in slidable contact with an outer peripheral surface of the shaft; and at least one annular spring that presses the lip against the outer peripheral surface of the shaft, wherein:

the lip is between the outer peripheral surface of the shaft and the at least one spring, the elastic member is made of an electrically conductive elastic material, the lip includes a contact surface in contact with the outer peripheral surface of the shaft, and the contact surface is straight in a natural state when viewed in a cross section defined by a plane that includes a central axis of the elastic member; and wherein, a thickness of a part of the lip between the at least one spring and the outer peripheral surface of the shaft is defined as t, and a width of the contact surface in an axial direction of the shaft is defined as W1, and a relationship between t and W1 satisfies the following inequality: t<W1.

2. The sealing device according to claim 1, wherein the at least one spring includes more than one spring that is arranged along an axial direction of the shaft.

3. The sealing device according to claim 1, wherein the at least one spring includes a spring that is flat in a radial direction of the shaft.

4. The sealing device according to claim 1, wherein:

the contact surface has at least one groove that extends along a circumferential direction of the shaft, and the at least one groove holds a conductive lubricant.

5. The sealing device according to claim 1, wherein:

the elastic member further includes a protruding portion that protrudes from the fixing portion in a direction that differs from the lip, and the protruding portion is in contact with the outer peripheral surface of the shaft at a position different to the lip in the axial direction of the shaft.

6. The sealing device according to claim 5, wherein:

the elastic member is provided with a recessed portion for defining a space surrounded by the following:

the outer peripheral surface of the shaft, the lip, and the protruding portion, and the recessed portion holds a conductive lubricant.

7. The sealing device according to claim 1, wherein a width of the at least one spring in the axial direction of the shaft is defined as W2, and a relationship between W1 and W2 satisfies the following inequality: W1>W2.

8. The sealing device according to claim 7, wherein a relationship between t and W2 satisfies the following inequality: t<W2.

9. The sealing device according to claim 1, wherein the reinforcing ring is electrically conductive.

10. The sealing device according to claim 9, wherein, where WD is a width of the reinforcing ring in the radial direction of the shaft, and AD is a distance between the inner peripheral surface of the housing and the outer peripheral surface of the shaft, WD/AD is 0.5 or more and 0.9 or less.

11. The sealing device according to claim 1, wherein the at least one spring is electrically conductive.

12. An electric motor comprising:

a housing with an opening;

a shaft within the opening; and a sealing device that is disposed between the housing and the shaft, and that seals a gap between an inner peripheral surface of the housing and an outer peripheral surface of the shaft, wherein the sealing device comprises:

an annular reinforcing ring fixed to the housing;

an annular elastic member comprising:

a fixing portion fixed to the reinforcing ring; and a lip that protrudes from the fixing portion and is in slidable contact with an outer peripheral surface of the shaft; and at least one annular spring that presses the lip against the outer peripheral surface of the shaft, wherein:

the lip is between the outer peripheral surface of the shaft and the at least one spring, the elastic member is made of an electrically conductive elastic material, the lip includes a contact surface in contact with the outer peripheral surface of the shaft, and the contact surface is straight in a natural state when viewed in a cross section defined by a plane that includes a central axis of the elastic member; and wherein, a thickness of a part of the lip between the at least one spring and the outer peripheral surface of the shaft is defined as t, and a width of the contact surface in an axial direction of the shaft is defined as W1, and a relationship between t and W1 satisfies the following inequality: t<W1.

13. The electric motor according to claim 12, wherein a width of the at least one spring in the axial direction of the shaft is defined as W2, and a relationship between W1 and W2 satisfies the following inequality: W1>W2.

14. The electric motor according to claim 13, wherein a relationship between t and W2 satisfies the following inequality: t<W2.

* * * * *